Patented Feb. 19, 1952

2,586,726

UNITED STATES PATENT OFFICE 2,586,726

METHOD OF PRODUCING LIGHTWEIGHT INORGANIC INSULATING MATERIAL

Clyde C. Schuetz, Mount Prospect, and Charles R. Norman, Jr., Evanston, Ill., assignors to United States Gypsum Company, Chicago, Ill., a corporation of Illinois No Drawing. Application February 4, 1948, Serial No. 6,334

2 Claims. (Cl. 92—55)

The present invention relates to an improved method for the manufacture of light weight inorganic insulating material.

The invention is particularly adapted for the production of pipe coverings and similar preformed shapes such as may be employed for the heat insulation of steam pipes, boilers and the like, in which fluids having a temperature as high as 1000° F. may be present.

In the copending application of Clyde C. Schuetz, Serial No. 497,713, now Patent No. 2,442,519, there has been disclosed a novel composition and process for producing an insulating material of the general type with which the present invention is likewise concerned. The composition of said copending application bears, so far as the materials are concerned, a close relationship to the articles produced in accordance with the present invention, the chief difference between the invention disclosed and claimed in said copending application and the present application lying in the improvements in procedural steps which lead to the production of shapes whose dimensions can be accurately predetermined, and which require very little machining or after-finishing.

It is one of the objects of the present invention to provide a new forming process for inorganic insulating materials which have an apparent density below about 20 pounds per cubic foot, and are made from asbestos fiber and an inorganic binder resulting from the reaction of a pozzolanic substance, and a material capable of yielding an alkaline earth hydroxide.

A further object of the present invention relates to an improved process which involves a preforming step in which a material is produced in the form of lumps which are capable of being charged into a mold and compressed therein to form the final article while excess water is expelled therefrom during the forming operation.

Other objects and advantages will become apparent from the further discussion hereinbelow.

One of the primary advantages of the present invention lies in the fact that a great many less molds are required than when operating in accordance with prior art procedures.

Moreover, a further advantage is in the greater compactness in the loading of an autoclave in which the final hardening of the materials takes place, which results not only in a lowering of the investment in plant, but also in reduction in the labor cost involved in the processing of the materials.

The invention bears some similarity to the manufacture of a material which has been known for a long time and which is commonly termed "85% magnesia." Such "85% magnesia" usually consists of asbestos and basic magnesium carbonate, the formula of which is substantially $4MgCO_3 \cdot Mg(OH)_2 \cdot 5H_2O$, bonded only by the felting of the components and the shrinkage which accompanies drying, and usually contains about 15% of the asbestos and 85% of the basic magnesium carbonate. In shaping these magnesia blocks this is accomplished in so-called filter molds in which a filter cake is produced which has substantially the shape of the final article. As, however, there is considerable and variable shrinkage in the eventual processing and drying, this must be taken into account and the finished pieces of the "85% magnesia" must be milled to size. This milling occasions a considerable loss in material and moreover is a very dusty operation.

By contrast, the present process allows the production of forms, shapes and articles which can be accurately controlled as to size and density and which require very little finishing or milling to bring them to the dimensions specified by the maker or purchaser.

Generally speaking, the materials which are used in the present composition are quite similar to those disclosed in the already mentioned copending application Serial No. 497,713, differing therefrom mainly in that a more dilute mix is used in producing the initial material. However, in the preferred embodiment of the present invention a particular type of clay is preferred, which consists mainly of the bentonitic type of clays, specifically bentonite, hectorite, montmorillonite, and similar colloidal clays. Essentially the materials employed are asbestos fiber and pozzolanic substances and a material capable of yielding an alkaline earth hydroxide. These materials are mixed under certain conditions so as to produce a suspension which is quite dilute but which will settle but little in and during the initial processing stage.

In order to describe the invention, a number of examples are given in which, in connection with the first example, most of the manipulative details will be described, it being understood at the outset that similar manipulative procedures are to be understood as being used in connection with the formulas given with the other examples.

Example I

Formula:

| | Parts by weight |
|---|---|
| Asbestos fiber (Quebec Standard Grade 5K) | 65 |
| Blast furnace slag (water granulated, finely ground) | 120 |
| Bentonite (ground) | 30 |
| Hydrated high-calcium lime | 30 |
| Diatomaceous earth | 20 |
| Caustic soda | 2 |
| Water | 2000 |

The dry materials listed above are mixed with the stated amount of water in a suitable agitator so as to produce a relatively thin slurry. In general, the amount of water is from about 7 to 10 times the weight of the solids. At least about 5 parts of water should be used. The slurry is then fed through a machine of the general type of a Bauer pulper or any other machine so constructed as to make it possible to force the slurry through very narrow openings at extremely high velocity. This treatment brings about, for a reason not fully understood, an amazing increase in the viscosity of the mixture, which thus becomes more of a consistency of a heavy cream, which, however, can still be poured. This heavy creamy material is then poured into shallow pans, preferably to a depth of not more than about 2" in order to allow rapid penetration of heat therethrough, and the pans are then placed into a steaming-chamber wherein they are subjected to heating in an atmosphere of moist air or steam at a temperature of from about 185° to 212° F. for a period of about one and one-half hours or more, the latter temperature being preferred. There is sufficient steam added to avoid, as far as possible, any significant evaporation of the water in the mixture, as the main purpose of the heating is to bring about a preliminary or primary reaction between the pozzolanic material on the one hand and the alkaline earth constituents on the other. The heating must be accomplished without stirring, i. e. in a completely quiescent state. If the heating is accompanied by stirring, the desired thickening does not take place.

Higher temperatures, say up to that corresponding to about 50 pounds' gauge pressure (300° F.), may be used if the heating is carried out under pressure, taking due care to reduce the pressure slowly enough after the reaction is completed to prevent spurting of the mixture before opening the autoclave. Correspondingly, when steam pressure is used, the length of time the mixture is subjected to the steam pressure must be shortened so that the mixture will not stiffen to such an extent that poor formation of the article will take place or that the reaction of the materials is carried so far that a poor bond will result in the final autoclaving of the shaped article.

As a result of the reaction the material will form a sort of puffed, expanded, gelatinous mixture, which occupies about 115% of the original cubic content of the slurry. Moreover, the mixture also stiffens sufficiently so that it will no longer pour but instead has been transformed into a spongy porous mass of substantially higher volume than that of the original charge. This mass is moreover capable of being broken up into individual lumps or pieces without losing any substantial amount of its constituent water. In other words, it forms an admirable intermediate for the carrying out of the further steps of the present invention.

The second step in the process consists in breaking up the spongy material thus far made by feeding it, for example, through a revolving drum, or otherwise subjecting it to a mild breaking-up action for the purpose of dividing it into lumps which may vary in diameter anywhere from about ¼" to 2". Care should be taken during the breaking up not to lose more than say about 15% of the water present in the spongy material. Moreover, the breaking up should not be accompanied by any substantial amount of pressure, because it is desired to preserve as much as possible of the physical water in the lumps. If the disintegration is carried out in such a manner that a stirring type of action results, the thixotropic properties of the mass will be lost or reduced and the material becomes fluid, so that the desired self-sustaining shape will not result from the pressing thereof unless a much higher density is reached. These lumps are of a peculiar consistency and may be squeezed in the hand with the expulsion of water very much in the manner of a sponge, thereby being considerably diminished in volume, or, in other words, compressed. The bulk volume of the mass of broken up lumps is about 250% of that of the initial liquid mixture that was poured into the pans. In order to produce the shapes which are to be made, as for example hemi-annular pipe covering, boiler covering, and the like, the lumps are fed into an appropriate mold, the bottom of which is shaped to correspond with the shape of the bottom of the article that is to be formed. The bottom of the mold moreover is foraminous, being for example made of a perforated plate which is covered with a fine screen or filter cloth, which, while it will permit the passage of water, will retain the solids contained in the lumps.

The upper portion or ram of the mold is shaped to correspond with the upper contour of the article and is likewise foraminous, and is in effect similar to the bottom of the mold. When a sufficient quantity of the wet lumps has been placed in such a mold, the ram is forced against the bottom mold, thereby compressing the charge of lumps, forcing them together and reducing them in volume and expressing the water therefrom so that they will assume the shape of the desired article. During this compression, the lumps also adhere to each other so as to form a more or less homogeneous final article. It is desired to start with a mixture so dilute that the desired density in the finished article is attained when the volume of the finished article in the closed press is substantially about 60% of the volume of the original liquid mixture as poured into the pans for steaming. This will give a mixture of sufficient mobility so that the resulting product is well knit, and of a uniform density.

It was found that the rate of pressing bears an important relationship to the ultimate quality of the product. Thus if the pressing rate is too slow it will be found that the lumps will not properly knit into a homogeneous mass, and the surfaces of the article are likely to be rough. However, if the pressing is accomplished at a fairly rapid rate, it appears that the surge of the water which is escaping from the lumps under the influence of the pressure, disrupts the lumps and thereby produces a condition in which the surfaces against which the material is being pressed will be more accurately reproduced, and the surfaces of the article will be smooth. In any event, a far better article is produced when the press head has a velocity for instance of about ½" per second, while a rate of 2" per second is even preferable. It was found that the depth of the charge of lumps or pieces should be reduced at a rate of at least about ½" per second to the desired product thickness. At a slow pressing rate the required pressure is quite low, but at a higher pressing rate, which is preferred, a pressure of as high as 50 pounds per square inch is indicated.

It was further found that in order to obtain well knit and structurally satisfactory products, the reduction in volume from the over-all bulk of the lumpy charge to the final article should be on the order of at least two-thirds of the initial bulk volume.

The articles which are formed in the compression molds are firm enough so that they may be removed therefrom and will be found to be self-sustaining. This is even true of the split hollow cylinders such as are used for pipe coverings, and these will stand up as an arch on a flat plate support. This is true of all standard sizes of pipe covering up to as high as that for a 14" outside diameter pipe.

After the articles have been formed by the pressing of the lumps as hereinabove described, the articles are placed in a suitable autoclave or other steam tight vessel and are subjected therein to saturated steam to effect the final reaction or hardening of the material.

It is advisable to use a pressure of about 100 pounds (gauge pressure) per square inch for a period of about five hours in case of sections of a thickness of 1". If higher pressures are used, the time period may be shortened. A lower pressure, say about 80 pounds per squire inch (gauge pressure) may be used, in which case, however, the time period must be extended, and it was found that this is not economical. It will of course be appreciated that with thicknesses greater than 1", a correspondingly longer curing time under steam pressure will be required.

During the autoclaving the reactions between the pozzolanic substances and the material yielding the alkaline earth hydroxides will complete themselves, the resulting material acting as a bonding agent for the asbestos fibers. After the reaction has been completed by the autoclaving procedure just described, the steam is released from the autoclave and the same is opened and the articles removed. They are then dried at any suitable temperature, which may go as high as 600° F. without harming the product.

After drying, the articles are milled at the surfaces where they are intended to join each other to produce, for instance, a completely circular pipe covering which is plane at the contacting areas in order to insure tight fitting joints in the ultimate installations. No trimming to size or milling to shape is required, because the linear shrinkage from the dimensions of the wet molded article prior to autoclaving to those of the final end product usually does not exceed about 1% and is quite uniform. Therefore, if the molds are made with a predetermined allowance for shrinkage, the dimensions of the ultimate product will be well within the commercial tolerances for this type of commodity. The drying may be accomplished in any of the well known conventional types of driers using either gas or oil firing. In this respect the material has a marked advantage over the so-called "85% magnesia" which has to be dried in steam heated driers to avoid calcination which would be fatal to the product. The product of the present invention will, on the contrary, safely withstand temperatures as high as 1000° F. In fact it is intended for use for insulation of installations reaching such temperatures.

The product made in accordance with Example I will have a final dry density of about 13 pounds per cubic foot, or an absolute density of approximately 0.208.

Example II

Formula:

| | Parts by weight |
|---|---|
| Asbestos fiber (Quebec Standard Grade 5K) | 100 |
| Magnesium oxide (light burned) | 46.5 |
| Diatomaceous earth | 31 |
| Finely ground water granulated blast furnace slag | 232 |
| Caustic soda | 4 |
| Water | 3000 |

Using the same technique as described in detail in Example I, a product may be made from the formula of Example II, yielding a product having a dry density of about 19.3 pounds per cubic foot, and a drying shrinkage of about 0.27%.

It will be noticed that in Example II the bentonite has been omitted, and magnesium oxide has been substituted for the calcium hydroxide of Example I. At the same time the amount of sodium hydroxide or caustic soda has been increased to make up for the lower alkalinity of the magnesium oxide. It appears that in the formulas given in the present specification, the sodium hydroxide acts as a catalyst to initiate the reaction. The technique of formation is the same as that fully discussed in connection with Example I.

Example III

It has been found that Portland cement may be employed to bring about the initial thickening of the mix in the atmospheric steaming ep. Accordingly a formula based upon Portland cement as one of the ingredients is as follows:

Formula:

| | Parts by weight |
|---|---|
| Asbestos fiber (Quebec Standard Grade 5K) | 79 |
| Portland cement | 163 |
| Diatomaceous earth | 32 |
| Fine silica (essentially 200 mesh) | 49 |
| Bentonite | 30 |
| Water | 3000 |

During the subsequent autoclaving the set of the Portland cement is completed while the free lime (calcium hydroxide) liberated during the setting of the Portland cement combines with the additional free silica to bring about the ultimate bonding effect. A product made in accordance with Example III will have a density of about 17 pounds per cubic foot and a drying shrinkage of about 0.27%. The technique of formation, and the manipulative procedures are the same as those described in detail in connection with Example I.

Example IV

The following formula may be employed:

| | Parts by weight |
|---|---|
| Asbestos fiber (Quebec Standard Grade 5K) | 65 |
| Steam pressure hydrated dolomitic lime | 30 |
| Fine silica | 20 |
| Bentonite | 30 |
| Finely ground water granulated blast furnace slag | 120 |
| Caustic soda | 2 |
| Water | 2725 |

In this formula it will be noticed that dolomitic lime has been used in place of the magnesium oxide or the high calcium hydrated lime of the previous examples. The activity of these materials when used conjointly with the pozzolanic blast furnace slag was sufficient to bring about the desired thickening in the atmospheric steaming chamber in a period of ninety minutes at about 212° F.

The free silica was added in order to enable a further reaction to take place in the autoclave at a pressure of about 100 pounds per square inch for a time period of approximately five and one-half hours. The product obtained by using formula of Example IV has a density of about 13.9 pounds per cubic foot, and a drying shrinkage of about 0.85%. The technique of formation was the same as that given in connection with Example I.

Example V

The following formula may also be employed:

| | Parts by weight |
|---|---|
| Asbestos fiber (Quebec Standard Grade 5K) | 100 |
| High calcium hydrated lime | 83 |
| Pumice (from Grants, New Mexico), ground to pass 200 mesh | 167 |
| Bentonite | 30 |
| Caustic soda | 5 |
| Water | 3000 |

In the above formula natural pumice is used in place of some of the other ingredients and it was found to yield when handled in accordance with procedures already outlined, a good strong usable pipe covering having a density of about 17.4 pounds per cubic foot.

Example VI

Another formula found useful in the present connection is as follows:

| | Parts by weight |
|---|---|
| Asbestos fiber (Quebec Standard Grade 5K) | 100 |
| High calcium hydrated lime | 50 |
| Calcined peerless #1 clay | 175 |
| Bentonite | 30 |
| Diatomaceous earth | 25 |
| Caustic soda | 5 |
| Water | 3000 |

It will be noticed that in this case there is a slight change in proportions and that a calcined clay was employed. A good strong usable pipe covering of a density of about 17.4 pounds per cubic foot, having a drying shrinkage of less than ½%, was produced. Manipulation procedures were the same as already described.

The six examples above given demonstrate that the process of the present invention is applicable to a broad range of compositions having a density of from about 13 to 20 pounds per cubic foot and which may be generally defined as comprising asbestos fiber, pozzolanic materials or, silica, and some substance capable of yielding an alkaline earth hydroxide such, for example, as Portland cement, the oxide or hydroxide of calcium or magnesium, or of course the corresponding other alkaline earth materials. Generally speaking, however, strontium and barium compounds, while within the contemplation of the invention, are too expensive for commercial application.

In using the term "pozzolana" in the present specification, it is intended to give it the signification which it has in Lea and Desch's book entitled "The Chemistry of Cement and Concrete" published in 1940.

Applicants are aware that precooking has been used in the past in connection with the thickening of lime-silica mixtures before subjecting them to autoclaving, but the idea was merely to create a suspension sufficiently thick to avoid undue settling, but no one prior to the present inventors has ever produced an expanded low-density potentially compressible mixture which could be converted into lumps which had sufficient coherence to rebond under pressure to a self-sustaining shape, which method of manipulation greatly facilitates the making of the insulation and particularly the accurate dimensioning thereof, and hence represents a great advance in this particular art.

In the already mentioned copending application of Clyde C. Schuetz, Serial No. 497,713, there has been described another means of thickening which has some similarity to that herein disclosed. However, none of the steps described in said copending application when used alone would yield a mass so thick that it would stand alone after pressing when it is diluted to such an extent that the product would have a density below 20 pounds per cubic foot. This is particularly true when forming articles such as a 14" outside diameter pipe covering which will form spans or arches over 17" in cross section. However, the combination of the two steps herein described will accomplish the desired objective.

We have also discovered that the addition of bentonite or similar gel-forming clays helps considerably in stiffening up the material so that distances of greater than 17." can be spanned without slumping of the articles prior to or during the autoclaving step. It was also discovered that bentonite, contrary to what would have been expected, was compatible with the other materials present, and nevertheless the final product had a drying shrinkage of only 1% or less.

The exact shapes into which the articles may be formed are of course entirely a matter of choice, and the invention is therefore neither circumscribed nor limited by the details disclosed hereinabove.

Applicants claim:

1. Process of producing a heat-insulating material having a density of from about 13 to about 20 pounds per cubic foot which comprises suspending a mixture of asbestos fibers, a finely-divided pozzolanic substance and a material capable of yielding an alkaline earth hydroxide in at least about five times its weight of water and subjecting the resulting suspension to sufficiently turbulent and violent agitation to produce a very slowly settling slurry, heating said slurry in a quiescent condition to a temperature between about 185° F. to about 300° F. but without vaporization of any substantial amount of its constituent water until, as a result of the reaction between the components of the mixture, the slurry sets up into a spongy mass; breaking up said spongy mass with a minimum of agitation to produce pieces suitable for transfer to a mold, transferring said pieces into a foraminous mold and rapidly compressing them therein into a coherent shape while expressing water therefrom, hardening the thus produced shape by heating it under superatmospheric steam pressure, and finally drying the resulting article.

2. Process of producing a heat-insulating material having a density of from about 13 to about 20 pounds per cubic foot which comprises suspending a mixture of asbestos fibers, a finely-divided pozzolanic substance and a material capable of yielding an alkaline earth hydroxide in at least about five times its weight of water and subjecting the resulting suspension to sufficiently turbulent and violent agitation to produce a very slowly settling slurry, heating said slurry in a quiescent condition to a temperature between about 185° F. to about 300° F. but without vaporization of any substantial amount of its constituent water until, as a result of the reaction between the components of the mixture, the slurry sets up into a spongy mass; breaking up said spongy mass into individual pieces with a minimum of agitation so as to retain at least 85% of their constituent water, transferring the pieces into a foraminous mold and compressing them therein with expulsion of free water at a rate sufficiently rapid to reduce the thickness of the charge at the rate of at least about ½" per second, hardening the resulting formed shape under superatmospheric steam pressure, and finally drying the resulting article.

CLYDE C. SCHUETZ.
CHARLES R. NORMAN, JR.

REFERENCES CITED

The following references are of record in the file of this patent:

UNITED STATES PATENTS

| Number | Name | Date |
|---|---|---|
| 1,520,893 | Teitsworth | Dec. 30, 1924 |
| 1,932,971 | Huttemann et al. | Oct. 31, 1933 |
| 2,105,324 | Huttemann et al. | Jan. 11, 1938 |
| 2,432,981 | Abrahams et al. | Dec. 23, 1947 |
| 2,442,519 | Schuetz | June 1, 1948 |